United States Patent
Harris et al.

(10) Patent No.: US 8,351,606 B2
(45) Date of Patent: Jan. 8, 2013

(54) POWER DISTRIBUTION SYSTEM SECURE ACCESS COMMUNICATION SYSTEM AND METHOD

(75) Inventors: Laurence N. Harris, Marysville, WA (US); Donald S. Berkowitz, Snohomish, WA (US)

(73) Assignee: S&C Electric Company, Chicago, IL (US)

( * ) Notice: Subject to any disclaimer, the term of this patent is extended or adjusted under 35 U.S.C. 154(b) by 1001 days.

(21) Appl. No.: 12/001,166

(22) Filed: Dec. 10, 2007

(65) Prior Publication Data

US 2008/0205649 A1    Aug. 28, 2008

Related U.S. Application Data

(60) Provisional application No. 60/879,758, filed on Jan. 8, 2007.

(51) Int. Cl.
*H04K 1/00* (2006.01)
(52) U.S. Cl. .......................................... 380/270; 370/338
(58) Field of Classification Search ............... 713/156, 713/168, 171, 178; 380/247–250, 277–278, 380/283, 285
See application file for complete search history.

(56) References Cited

U.S. PATENT DOCUMENTS

| | | | |
|---|---|---|---|
| 5,603,024 A * | 2/1997 | Goldring | 707/615 |
| 6,282,658 B2 * | 8/2001 | French et al. | 726/7 |
| 7,023,818 B1 * | 4/2006 | Elliott | 370/328 |
| 7,515,569 B2 * | 4/2009 | Prasad | 370/338 |
| 2001/0048744 A1 * | 12/2001 | Kimura | 380/247 |
| 2002/0061788 A1 | 5/2002 | Nakakita | |
| 2003/0039234 A1 * | 2/2003 | Sharma et al. | 370/338 |
| 2004/0003311 A1 * | 1/2004 | Jones | 713/320 |
| 2006/0277592 A1 * | 12/2006 | Brown et al. | 726/1 |
| 2006/0282667 A1 | 12/2006 | Kimn | |
| 2008/0063204 A1 * | 3/2008 | Braskich et al. | 380/270 |
| 2008/0072047 A1 * | 3/2008 | Sarikaya et al. | 713/171 |
| 2010/0174906 A1 * | 7/2010 | Li | 713/168 |

OTHER PUBLICATIONS

International Search Report (IPER) PCT/US2007/025,194.

* cited by examiner

*Primary Examiner* — Kambiz Zand
*Assistant Examiner* — Dant Shaifer Harriman

(57) ABSTRACT

A power distribution system may have source, switching and load components, wherein at least one of the source, switching and load components has a wireless communication capability such that it is operable to act as a wireless communication access point. A mobile station seeking to associate with the one component may use a secure access protocol to gain such access. The secure access protocol may provide for receiving at the one component a management message from the mobile station. From the management message the component may obtain mobile identification information used to verify the identity of the mobile station and to initiate communication by sending an association message. Until after successful verification of the mobile station identity the component remains radio silent.

27 Claims, 4 Drawing Sheets

POWER DISTRIBUTION SYSTEM SECURE ACCESS COMMUNICATION SYSTEM AND METHOD

This application claims the benefit of U.S. Provisional Application No. 60/879,758 filed Jan. 8, 2007.

TECHNICAL FIELD

This patent relates to communication systems and methods providing communication within power distribution systems.

BACKGROUND

Power distribution systems include technology to couple sources of power to loads while protecting the distribution infrastructure and maintaining service via circuit protection, fault isolation, circuit reconfiguration (typically for restoration of service to stranded, load-side customers) and system return-to-normal functions. For example, the power distribution system may include circuit switching and fault protection devices including: source protection devices, such as circuit breakers, load protection devices, such as fuses, and fault protection devices, such as fault interrupters, sectionalizers, reclosers and the like, that segment a distribution line and permit fault isolation. While various strategies may be employed to manage the power distribution system to maintain service and to protect the power distribution system, typically the fault protection devices should operate in a coordinated manner to optimize performance of the power distribution system and to minimize the scope and duration of service interruptions. That is, to isolate a fault at the fault protection device nearest the fault to protect the source and to preserve service to loads between the source and the fault protection device.

At the same time, the power distribution system should be manageable, recoverable and operable at a high level of performance with reduced burden. These goals become difficult to obtain as the distribution system becomes heavily populated with distributed, intelligent devices that allow an operator to manage and control the distribution of power and protect the distribution infrastructure.

Wide area communication systems have been employed for several decades as a means to enhance the automation of electric power distribution systems to provide management, improved operation and system recovery. These systems are responsible for controlling the distribution of power from sources/substations out over medium voltage feeders/distribution lines to consumers and are typically radio based due to the high cost of providing fiber or other fixed communication media over a wide geographic area. An example of commercial communication products include the Utilinet radio, sold by Schlumberger, Inc. Most of these products are used in conjunction with SCADA systems, or other low to medium-speed communication applications such as the IntelliTEAM® circuit reconfiguration system, available from S&C Electric Company, Chicago, Ill.

Many aspects of the management and control and particularly the fault protection of the power distribution system, on the other hand, require high speed (low latency) and high reliability communications. Such systems are again preferably radio-based to take advantage of the ease and low cost of installation. An example of such a system includes the HRDS system available from S&C Electric Company. These systems utilize dedicated point-to-point links and dedicated communication channels for each pair of communicating devices. A company called Freewave Communications offers a radio-based off-the-shelf product for use in conjunction with the Schweitzer Engineering Laboratories, Inc. (SEL) mirrored-bits communication protocol. With these two technologies, digital status points can be conveyed between two interconnected distribution automation control devices over radio-based communication infrastructure.

Mesh-topology communication systems, communication systems based upon the Internet's Ad-Hoc Routing methodology, spread-spectrum radio communication systems and, in particular, wireless network communication architecture based upon the IEEE 802.11 standard have found application to provide radio-based communication infrastructure for power distribution systems. The 802.11 standard, in fact, provides a simple and readily implemented solution using off-the-shelf hardware and software.

Security is vitally important to protect the power distribution infrastructure from unauthorized access, reconfiguration or misconfiguration or even terrorist attack. Security in accordance with the IEEE 802.11 standard, for example, comes in two layers. No single element provides an impenetrable protective barrier, so protection is built in layers of methods of operations and particular behaviors.

The IEEE standard provides two basic network architectures: infrastructure and ad hoc. In the infrastructure type network, there is a master station, called an access point (AP) that broadcasts its identity, i.e., service set identifier or SSID, and responds to requests for association. A wireless station that wants to associate with the AP sends a request and will receive back a message indicating that it is now associated with the AP. The AP controls making all associated stations take turns to avoid collisions—two transmitting at once.

In the ad hoc type network there is no master station or access point, per se, just a collection of nearby stations indicating their willingness to participate in an ad hoc network. This is accomplished with the transmission of particular types of network management messages. There is also a distinction made within ad hoc networking, that of attempting to initiate an ad hoc network and that of merely being willing to join an ad hoc network if one should happen to form in the presence of the merely-willing-to-join station.

In the ad hoc network setup process, nothing happens unless at least one station is sending out a message requesting others to participate in an ad hoc network. There could be ten potential participants within range, but no network would form unless at least one station suggested the idea. Suggesting the idea is accomplished via a special management message.

The 802.11 standard also provides that each AP is configured to broadcast a BEACON frame. The periodicity of the BEACON frame may be adjusted, but in each instance the BEACON frame must be provided. Furthermore, the BEACON frame must contain a minimum data set including: timestamp; beacon interval; capability information; SSID; supported rates; one of FH/DS/CF parameters sets, IBSS parameter sets (for ad hoc networks) and TIM for the AP. The SSID is a sort of password that identifies the AP. The SSID may be set to null in the BEACON, in which case the BEACON, while still broadcast by the AP does not identify the AP.

A station wishing to associate with an AP may identify an available AP in one of two ways: actively by sending a PROBE REQUEST or passively by simply listening for the BEACON. If the SSID is set to null, the station can scan the BEACON but cannot identify and associate with the AP because it lacks the SSID. If the AP SSID is known to the station, however, it can send a PROBE REQUEST with the AP SSID to which the AP responds with an acknowledgement message. An association can be established provided that other identification/security authentication/encryption is successful.

As apparent from the standard, an AP either broadcasts its SSID or responds to PROBE REQUESTs containing its SSID, e.g., when the SSID field of the BEACON is set to null. An intruder may learn the AP SSID either from the BEACON or by listening to PROBE REQUESTs. The intruder may then use the learned SSID to initiate its own PROBE REQUEST or use other methods to attempt to gain access to the network via the AP.

What is needed is communication access system or protocol that does not in and of itself render the network vulnerable to unauthorized access. The system and method should do so without requiring complex, time-consuming configuration and preferably using off-the-shelf or only modestly modified off-the-shelf hardware and software.

DETAILED DESCRIPTION

Figure 1:
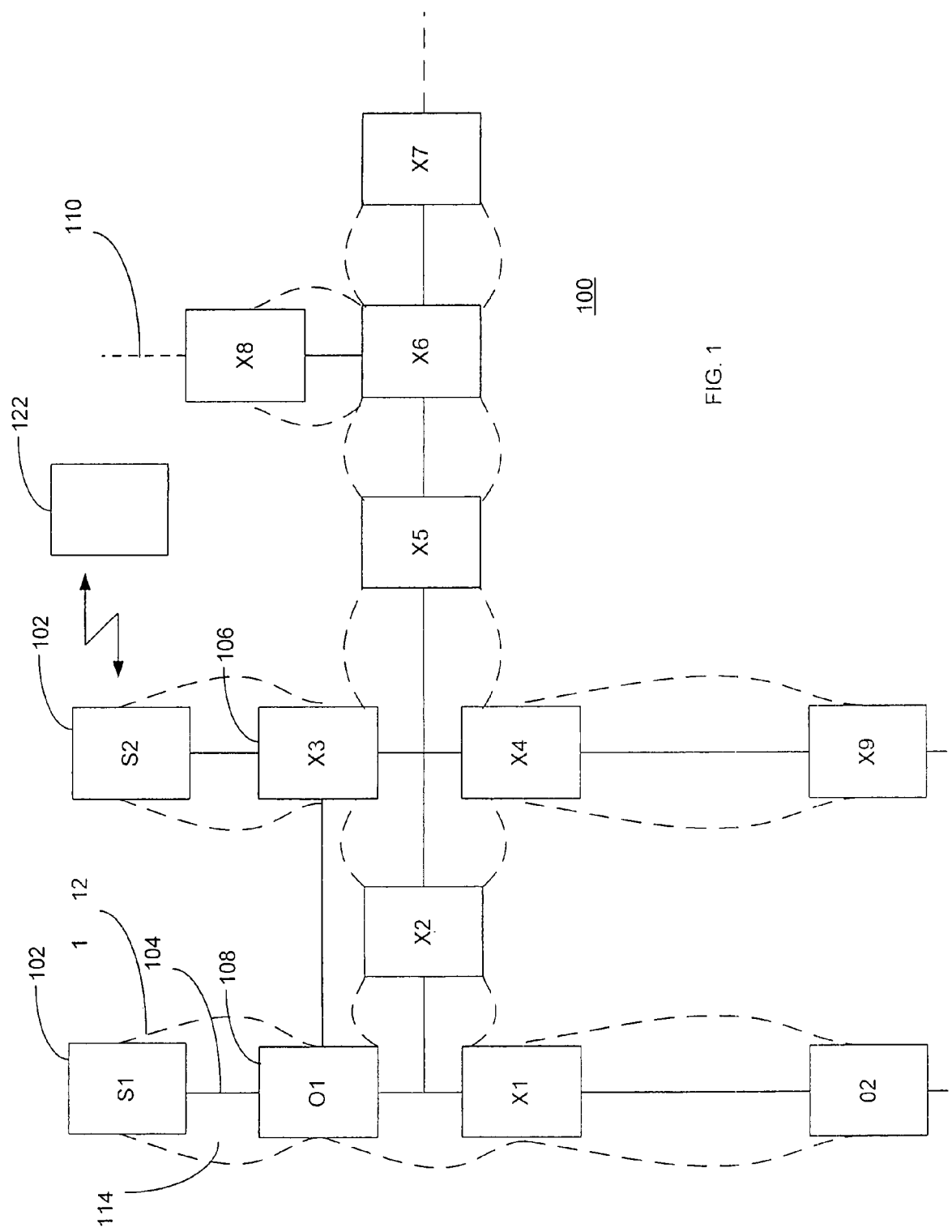
FIG. 1 is a schematic illustration of a power distribution grid incorporating network communication architecture in accordance with one or more of the herein described embodiments.

A power distribution system may incorporate a network communication capability. The network communication capability may be configured or may be configurable to provide infrastructure or ad hoc-like network access generally in accordance with the IEEE 802.11 standard. The network furthermore may be configured to implement a secure access protocol. In one embodiment, for example, access points within the communication network remain silent and do not broadcast a BEACON or other signals prior to receiving a PROBE REQUEST or other management message from a station attempting network access. The management message may contain identification information for the station seeking access, which information is compared against a database of permitted stations before any response is made to the requesting station. Other aspects of the secure access protocol will be appreciated from the following discussion taken in conjunction with the accompanying drawings.

In one possible embodiment, a power distribution system may have source, switching and load components, wherein at least one of the source, switching and load components has a wireless communication capability such that it is operable to act as a wireless communication access point. A mobile station seeking to associate with the one component may use a secure access protocol to gain such access. The secure access protocol may provide for receiving at the one component a management message from the mobile station. From the management message the component may obtain mobile identification information which is then used to obtain an encryption key from a memory. The encryption key is associated with the mobile station and allows the component to decrypt a portion of the management message to obtain decrypted information. The decrypted information allows the component to verify the identity of the mobile station and to initiate communication by sending an association message. Until the mobile station identity is verified, however, the component remains radio silent. That is, the association message is only communicated to the mobile station after verification of the identity of the mobile station based upon the decrypted information.

In another embodiment, a mobile station may associate with an access point of a communication or data network using a secure access protocol. In such a protocol, the access point remains radio silent. That is, the access point does not broadcast a BEACON or other signals until after receiving an association request and verifying the source of the association request. In this regard, the access point may remain radio silent until receiving from the mobile station a management message with a request to associate. The access point then verifies the identity of the mobile station based upon a data portion of the management message, and communicates an association message to the mobile station only after a successful verification of the mobile station identity based upon the data portion of the management message. Thus, the association message is only communicated to the mobile station after the verification of the mobile station's identity.

In any of the herein described embodiments, once a component or access point verifies the identity of a mobile station seeking to associate, it may respond in the association message with a session key used to encrypt further communications between the mobile station and the access point/component. The session key may be encrypted using a private key stored in a memory accessible by the access point/component.

It should be understood that while various communication technology, techniques and methodologies will be described in connection with the various herein described embodiments of the communication network, the system components and structures, techniques and methodologies may well be interchangeable in various actual implementations. Thus, one of ordinary skill in the art will appreciate that while each element, structure, feature or technique may not be described in connection with every embodiment they are variously combinable in implementations not specifically described herein; however, such combinations are contemplated within this disclosure. Furthermore, while the communication architecture, systems and methodologies are described primarily in connection with power distribution systems, these architectures, systems and methodologies may be employed with various other systems such as petroleum processing and distribution systems, emergency services and first responder communication systems and the like. With that, FIG. 1 illustrates an example open loop or radial electrical distribution system 100 that may incorporate the communication architecture, systems and methods, i.e., a communication network, in accordance with one or more of the herein described embodiments or combinations thereof.

The electrical power distribution system 100 illustrates a typical electrical power distribution structure and how such a system operates. The system 100 may incorporate one or more substations or sources of supply (S1-*n*) 102 that provide electricity for distribution via the system 100. The solid straight lines 104 illustrate distribution lines or conductors that connect between the sources 102 and closed switches (X1-*n*) 106 and open switches (O1-*n*) 108. Each line 104 typically represents a three-phase distribution feeder, which may or may not contain a fourth ground conductor depending on the type of distribution. The dashed straight lines 110 indicate connections to adjacent feeders or adjacent substations (not depicted). The curved dashed lines 112 indicate portions (or segments) 114 of the distribution system 100 bounded by switches 106/108. This description of the distribution system 100 is consistent with the architecture of the IntelliTEAM-II circuit reconfiguration system where the switches 106/108 associated with each of these segments 114 is known collectively as a "team" (T1-$n$). Optionally provided repeaters/routers (R1-$n$) (not depicted) may be repeating radios that form a portion of a network.

Figure 2:
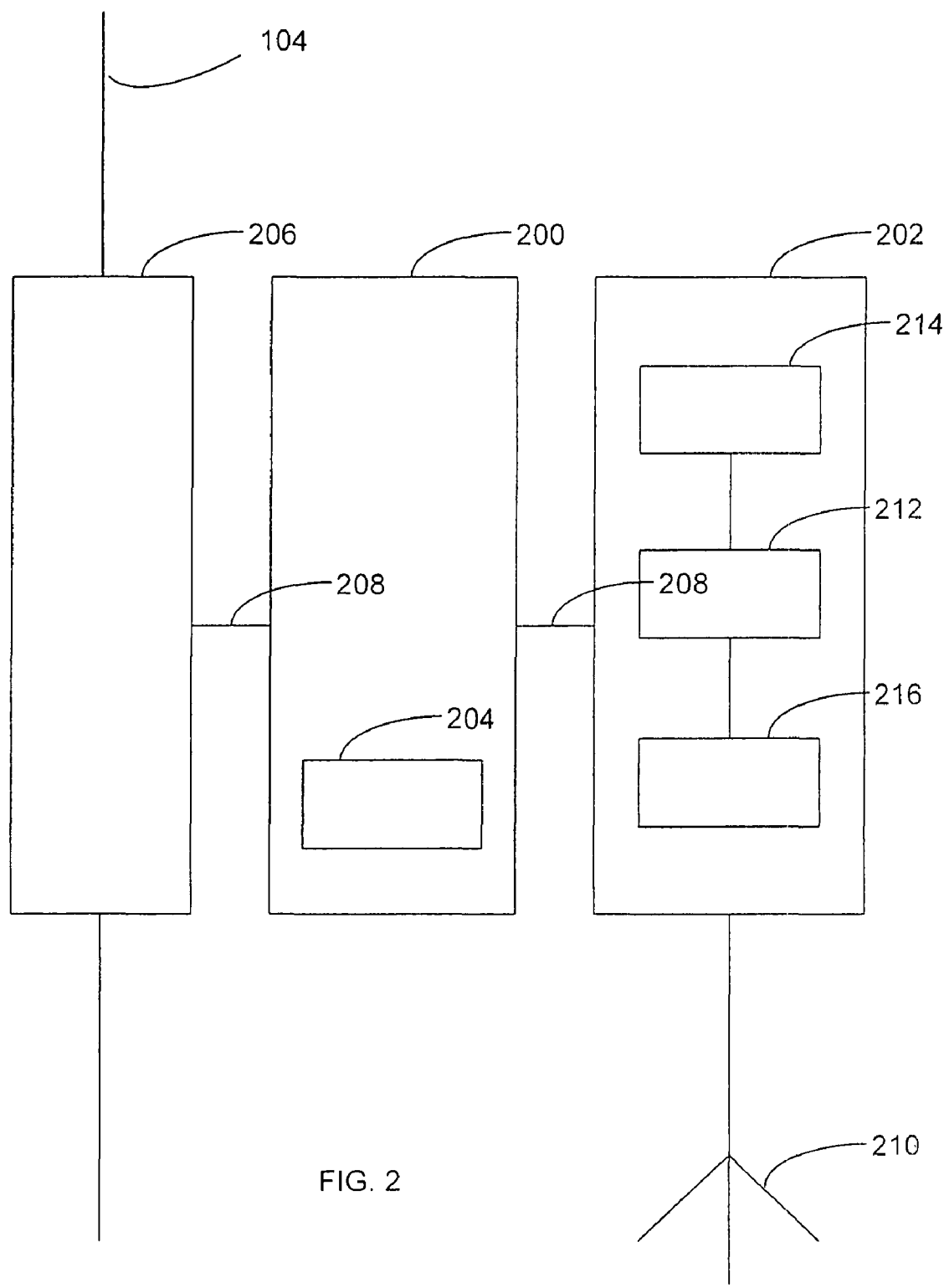
FIG. 2 is a block diagram of a distributed power distribution device including network architecture communication capability in accordance with one or more of the herein described embodiments.

FIG. 2 illustrates a typical switching or fault protection device, device 200 that may provide the function of the switches 106/108 of the system 100. The device 200 may include a control 204 that couples to a circuit interrupting or switching device 206, such as a circuit breaker, vacuum fault interrupter or the like. The control 204 may include internal memory or may couple to memory (not depicted) wherein is stored a control program, operating parameters and station identification information used by the control 204 to affect operation of the device 200. The device 200 may further include a power supply, which may be provided by an external source, a storage source, a distribution line tap, or any other suitable power source, (not depicted).

The device 200 couples to an associated communication device 202 that operates in accordance with a communication architecture and communication protocol consistent with the herein described embodiments. Alternatively, the communication device 202 may be incorporated within the device 200. One possible communication device 202 is a frequency hopping spread spectrum radio such as the Nova Engineering Inc. NovaRoam EH900. The communication device 202 may connect to the control 204 via a 10/100 MBS Ethernet connection 208, and seamlessly creates what appears to the control 204 to be an Internet Protocol (IP) wide area network. The control 204 may similar connect to the switching device 206. The communication device 202 may implement an OSI-compliant TCP/IP communication protocol stack, and may allow messages to be intelligently routed within the system 100. In this regard, the communication device 202 may include a controller 212 coupled to a memory or cache 214. The memory may store electronically, optically or otherwise a control program used by the communication device to affect generation, transmission, receipt and/or routing of messages, data containing messages, system overhead messages, mapping and discovery messages, system maintenance messages, and the like. The controller 212 is further coupled to a transmitting device 216 that couples to an antenna 210. The communication device 202 and transmitting device 216 may be configured to implement the 802.11 protocol, or other suitable wireless access protocol. Additionally, the communication device 202 may be configured to couple via wired connection (not depicted), such as by twisted pair coupling, e.g., Category 5 or similar, to a network, other power distribution system devices or to other devices generally.

Each of the devices, some subset of the devices or at least one of the devices, e.g., sources 102, switches 106/108, loads and repeaters (not depicted) within the system 100 may form access points or nodes of the communication network and as such incorporate a communication capability such as the communication device 202 described in connection with the device 200 or any other suitable communication capability. The communication system may incorporate stationary stand alone communication devices, e.g., the aforementioned devices, and may furthermore incorporate mobile communication devices, mobile units 122, such as communication devices, wireless enabled computing devices, handheld computing devices, cellular data-enabled communication devices and the like associated with mobile service personnel that may include a communication capability, memory and process capability in order to operate to affect generation, transmission, receipt and/or routing of messages, data containing messages, system overhead messages, mapping and discovery messages, system maintenance messages, and the like. Still further, communication devices that are not part of the power distribution system may be incorporated into the network. These devices may include public or private wireless access points, wireless enabled computing devices, handheld computing devices, cellular data-enabled communication devices, and the like that may be made to communicate in a manner compatible with the herein described communicate network and protocol.

Figure 3:
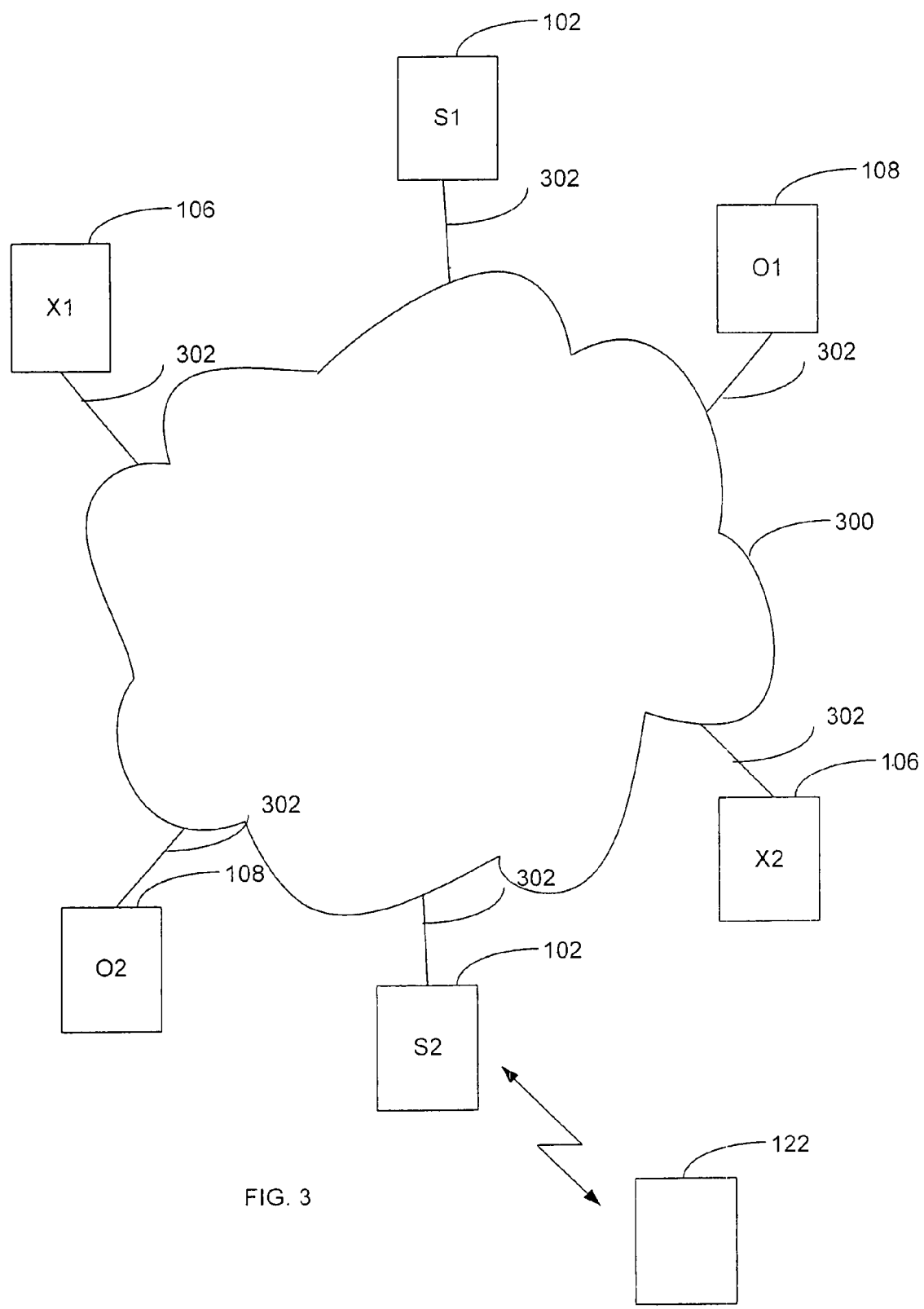
FIG. 3 is a schematic illustration of a network communication architecture in accordance with one or more the herein described embodiments.

FIG. 3 illustrates the sources 102, switches 106/108, loads and repeaters (not depicted) coupled to a network 300, such as a private wide area or local area network, the Internet or combinations thereof via wired or wireless connections 302. As noted, some portion, selected ones or all of the sources 102, switches 106/108, loads and repeaters may be configured to act as wireless access points and as such may be configured to implement an 802.11-like protocol. Having an access point capability permits the mobile station 122 to access the system 100, for example by associating with the one device configured to act as an access point, e.g., switch 102.

To enhance security for communications between the fixed location wireless-enabled devices (fixed location devices), e.g., sources 102, switches 106/108, loads and repeaters, and a mobile wireless-enabled device (mobile stations), e.g., mobile station 122, the devices may implement a strategy and protocol that may be considered a modified form of the 802.11 sequence of network formation and that may employ mutual authentication using two pairs of public and private encryption keys.

Each fixed location device initially remains radio-silent. That is, it does not broadcast any messages, nor respond to standard probe request management messages, but it is listening for a management message requesting the formation of an ad hoc network between the mobile station and the specific SSID of the fixed location device.

The fixed location device, listening for a message requesting it to form an ad hoc network, or to permit association in an infrastructure network, looks at specific content in the management message. The management message contains mobile station, i.e., sender, identification information, and the fixed location devices parses the management message to find the sender identification information. The fixed location device then looks in a list for a public encryption key for that sender. Referring again to FIG. 2, public key data may be retained in the memory 214, and the controller 212 may search the memory 214 for public key corresponding to the sender information. Absent public key information retained in the memory 214, the controller 212 may initiate a request via the network 300 to other fixed location devices, to a central database or other storage locations to obtain the public key information corresponding to the mobile station. Using the public key, the fixed location device, e.g., the controller 212, decrypts a portion of the message content. This decryption yields a time stamp and a hashed (e.g., SHA-1) copy of the sender/mobile station identity. Should any of the decoding and interpretation steps not yield an expected result, the fixed location station remains radio-silent, not even acknowledging to the mobile station that it exists.

To increase the security level within the management message sent by the mobile station the SSID of the fixed station data may be a hashed version of the fixed location device's serial number as the management message will in most situations be required to contain the SSID of the fixed station device in order to prime it for a possible response. Alternative strategies permitting and managing responses from one or more fixed location device receiving the management message may allow the management message not to include the SSID of a particular fixed location device. The addition of a time-stamp in the encrypted portion of the management message allows that time stamp to be recorded by the fixed location device and checked upon receipt of later received management messages in order to prevent a "playback attack" to attempt to gain access to the fixed station.

As appreciated from the foregoing discussion, the fixed location device or fixed station employing the method described is programmed in a manner that deviates from the IEEE 802.11 standard and may require modified "operations control" software, e.g., the software controlling the operation of the communication device 202. The addition of encrypted content to management messages transmitted by mobile stations also deviates from the IEEE 802.11 standard, although such functionality may be implemented using standard elements of the defined management messages provided there exists sufficient flexibility in the manufacturer provided device driver software. There may therefore be certain wireless network interface device drivers that will not support implementation of the described method. A variation of the method can be employed to permit usage of such not easily modifiable devices and which brings the operation substantially within the 802.11 standard defined for a mobile station.

A feature of a security enhancing method in accordance with the herein described embodiments is an ability to have the fixed location device or fixed station maintain radio silent until it is certain that there is a legitimate mobile station with which to communicate. While using certain particular large elements of a management message is a more direct way to provide the encrypted information necessary for the fixed station to obtain encrypted mobile station identifying information, it is possible to employ a smaller, universally supported part of standard messages to convey sufficient encoded information to provide for initial recognition as an authentic mobile station.

The information elements to be conveyed by the mobile station to the fixed, radio-silent station may include:
1) An assertion of identity of the mobile station (this could be a simple short unique ID number),
2) An encoded target address for the fixed station (this could be as simple as a hashed device serial number),
3) A form of time-stamp or one-time-use message serial number (to prevent outsiders from replaying the message to inappropriately induce the fixed station to break radio-silence These elements may be combined and encoded in a manner that includes interleaving subsets or pieces of the information in a manner that would further obfuscate the nature of the encoded information. These interleaved, encoded information elements would have to be unscrambled and correctly interpreted by the fixed, radio-silent station in order to be recognized as coming from a legitimate source.

The combined elements further may be encoded in a manner that is compatible with the operational characteristics expected of all off-the-shelf wireless network interface device drivers with respect to the "Service Set Identifier" field (SSID) used in establishing association between two stations. (The typical device driver expects only printable ASCII characters.) Since in accordance with the 802.11 standard the SSID field provides only 32 characters and the encoded, encrypted or hashed information elements described above may require more than 32 characters for complete representation, the transmitting of the information elements may employ a sequence of association request transmissions with different SSID field contents.

The wake-up request to the radio-silent fixed station would appear, then, to an outside radio observer, as an attempt by the mobile station to associate with several different stations in rapid succession. This behavior is permitted by the 802.11 standard, although it would be atypical. The control over the mobile station configuration and operation could be provided by custom device driver software that would communicate and interact with the standard off-the-shelf wireless network hardware device driver. Once the fixed, radio-silent station is awake, it would allow a normal association to take place with the requesting station, and would then employ further within-standards messages (such as UDP/IP) to exchange public/private key encrypted information to more strongly authenticate the two stations to each other, and to establish a symmetric encryption session key. All further communications after that would be encrypted in a conventional manner until the session was ended.

Figure 4:
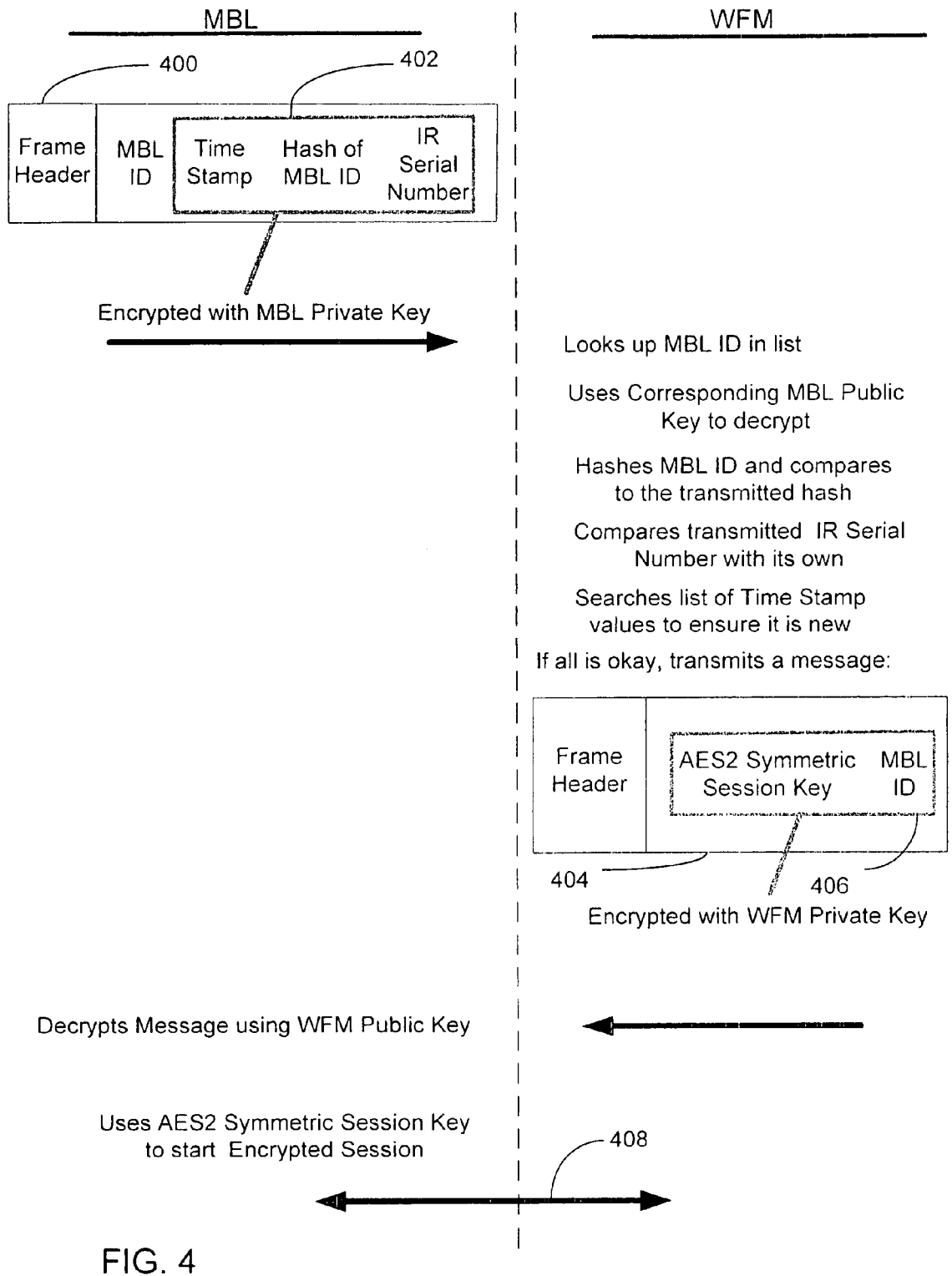
FIG. 4 is a line diagram illustrating a secure access protocol in accordance with one or more of the herein described embodiments.

FIG. 4 illustrates an example association process and a possible strong mutual authentication process employed after the stations are associated. As described above, a mobile station (MBL in FIG. 4) seeking to associate with a fixed location device (WFM in FIG. 4) communicates a management message 400 to the fixed location station. The management message 400 contains an encrypted portion 402 potentially including a time stamp, a hash of the mobile station identification and the fixed location station serial number. Upon receipt of the management message 400, the fixed location station looks up the mobile identification from a list and obtains its public key. Using the public key it hashes the mobile identification and compares it to the transmitted hashed mobile identification and compares the fixed location station serial number (fixed station ID) with its own. If the data compares, the fixed location station will allow association. The fixed location station may also compare a time stamp of the message 400 to ensure the message is new. Again, if everything checks out, the fixed location station transmits a reply message 404. The reply message 404 may include a session key to provide further encrypted communication following association. The session key may be an AES Symmetric key, or other suitable key. The data 406 contained in the message 404 is encrypted using the mobile station private key, obtained during the earlier look up, and the message 404 is transmitted. Using the session key, an encrypted session 408 follows.

While the invention is described in terms of several preferred embodiments of power distribution communication systems, it will be appreciated that the invention is not limited to such systems and methods. The inventive concepts may be employed in connection with any number of systems, devices and methods for providing secure access to a network communication system such as the Internet or the like.

While the present disclosure is susceptible to various modifications and alternative forms, certain embodiments are shown by way of example in the drawings and the herein described embodiments. It will be understood, however, that this disclosure is not intended to limit the invention to the particular forms described, but to the contrary, the invention is intended to cover all modifications, alternatives, and equivalents defined by the appended claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Unless a claim element is defined by reciting the word "means" and a function without the recital of any structure, it is not intended that the scope of any claim element be interpreted based on the application of 35 U.S.C. §112, sixth paragraph.

We claim:

1. In a communication system having at least one component with a wireless communication capability such that it is operable to act as a wireless communication access point, and a mobile station seeking to associate with the at least one component, a secure access protocol, the protocol comprising:
   receiving at the one component a management message from the mobile station;
   obtaining mobile identification information from the management message;
   obtaining an encryption key from a memory, the encryption key being associated with the mobile station based upon the mobile identification information;
   decrypting a portion of the management message using the encryption key to obtain decrypted information;
   verifying an identity of the mobile based upon the decrypted information;
   communicating an association message to the mobile station confirming an association, the association message only being communicated to the mobile station subsequent to verification of the identity of the mobile station based upon the decrypted information; and
   not sending any messages in response to the management message upon the failure to verify the identity of the mobile station.

2. The protocol of claim 1, wherein the management message contains identification information of the one component.

3. The protocol of claim 1, wherein the association message further contains a session key.

4. The protocol of claim 3, comprising encrypting the session key using a private key associated with the mobile station obtained from the memory.

5. The protocol of claim 4, wherein the encryption key comprises a public key associated with the mobile station obtained from the memory.

6. The protocol of claim 1, wherein the failure to verify the mobile station comprises failing to successfully complete any portion of the secure access protocol.

7. The protocol of claim 1, wherein receiving the management message comprises receiving a sequence of management message portions.

8. The protocol of claim 1, the management message containing a time stamp and verifying comprises checking the time stamp against a list of previously successfully used time stamps to prevent re-use.

9. The protocol of claim 1, the management message containing a random number, and verifying comprises checking the number against a list of previously successfully used random numbers to prevent re-use without reference to actual time.

10. A method of associating a mobile station with an access point of a communication or data network, the method comprising:
    maintaining the access point radio silent;
    receiving at the access point a management message from the mobile station seeking to associate with the access point;
    verifying an identity of the mobile station based upon a data portion of the management message;
    communicating an association message to the mobile station only after a successful verification of the mobile station identity based upon the data portion of the management message, the association message only being communicated to the mobile station subsequent to the verification of the mobile station identity; and
    comprising not sending any messages in response to the management message upon the failure to verify the identity of the mobile station.

11. The method of claim 10, wherein verifying the identity of the mobile station comprises obtaining mobile identification information from a memory accessibly by the access point.

12. The method of claim 10, wherein the management message contains identification information of the access point.

13. The method of claim 10, wherein the association message further contains a session key.

14. The method of claim 10, comprising encrypting the session key using a private key associated with the mobile station obtained from a memory accessible by the access point.

15. The method of claim 14, wherein the encryption key comprises a public key associated with the mobile station obtained from the memory.

16. The method of claim 10, wherein the failure to verify the mobile station comprises failing to successfully complete any portion of the verification protocol.

17. The method of claim 10, wherein receiving the management message comprises receiving a sequence of management message portions.

18. The method of claim 10, the management message containing a time stamp and verifying comprises checking the time stamp.

19. In a power distribution protection system having source, switching and load components, wherein at least one of the source, switching and load components has a wireless communication capability such that it is operable to act as a wireless communication access point, and a mobile station seeking to associate with the one component, a secure access protocol, the protocol comprising:
    receiving at the one component a management message from the mobile station;
    obtaining mobile identification information from the management message;
    obtaining an encryption key from a memory, the encryption key being associated with the mobile station based upon the mobile identification information;
    decrypting a portion of the management message using the encryption key to obtain decrypted information;
    verifying an identity of the mobile based upon the decrypted information;
    communicating an association message to the mobile station confirming an association, the association message only being communicated to the mobile station subsequent to verification of the identity of the mobile station based upon the decrypted information; and comprising not sending any messages in response to the management message upon the failure to verify the identity of the mobile station.

20. The protocol of claim 19, wherein the management message contains identification information of the one component.

21. The protocol of claim 19, wherein the association message further contains a session key.

22. The protocol of claim 21, comprising encrypting the session key using a private key associated with the mobile station obtained from the memory.

23. The protocol of claim 22, wherein the encryption key comprises a public key associated with the mobile station obtained from the memory.

24. The protocol of claim 19, wherein the failure to verify the mobile station comprises failing to successfully complete any portion of the secure access protocol.

25. The protocol of claim 19, wherein receiving the management message comprises receiving a sequence of management message portions.

26. The protocol of claim 19, the management message containing a time stamp and verifying comprises checking the time stamp against a list of previously successfully used time stamps to prevent re-use.

27. The protocol of claim 19, the management message containing a random number, and verifying comprises checking the number against a list of previously successfully used random numbers to prevent re-use without reference to actual time.

* * * * *